(12) United States Patent
Sok et al.

(10) Patent No.: US 11,569,751 B1
(45) Date of Patent: Jan. 31, 2023

(54) SYSTEMS AND METHODS FOR COMBINING POWER SOURCES IN DATACENTERS

(71) Applicant: Microsoft Technology Licensing, LLC, Redmond, WA (US)

(72) Inventors: Banha Sok, Kirkland, WA (US); Brandon Devaul, Redmond, WA (US); Chadd Nathaniel Garton, Woodinville, WA (US); John Joseph Siegler, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/559,377

(22) Filed: Dec. 22, 2021

(51) Int. Cl.
*H02J 1/12* (2006.01)
*H02M 5/42* (2006.01)
*H02M 1/42* (2007.01)

(52) U.S. Cl.
CPC ........... *H02M 5/42* (2013.01); *H02M 1/4208* (2013.01)

(58) Field of Classification Search
CPC ...................................................... H02M 5/42
See application file for complete search history.

(56) References Cited

U.S. PATENT DOCUMENTS

| | | |
|---|---|---|
| 3,745,365 A | 7/1973 | Spreadbury et al. |
| 8,866,345 B1 * | 10/2014 | Wright .................. H02H 1/043 323/908 |
| 9,379,579 B2 | 6/2016 | Kinnard |
| 9,642,282 B2 | 5/2017 | Bailey et al. |
| 9,661,777 B2 | 5/2017 | Mills et al. |
| 10,075,087 B2 | 9/2018 | Hoole |
| 10,186,982 B2 | 1/2019 | Morin |
| 10,209,727 B2 | 2/2019 | Chapel et al. |
| 2013/0197704 A1 * | 8/2013 | Pan ......................... H02J 3/36 363/35 |
| 2021/0013735 A1 | 1/2021 | Pachoud et al. |
| 2022/0109373 A1 * | 4/2022 | Fu ........................... B60L 53/22 |
| 2022/0131383 A1 * | 4/2022 | Milivojevic .............. H02J 7/34 |

(Continued)

FOREIGN PATENT DOCUMENTS

CN 104199534 A 12/2014

OTHER PUBLICATIONS

Jovanovic, Milan M., "Dual AC-Input Power System Architectures", In Proceedings of APEC, Seventeenth Annual IEEE Applied Power Electronics Conference and Exposition (Cat. No. 02CH37335), vol. 1, Mar. 10, 2002, 6 Pages.

(Continued)

*Primary Examiner* — Jared Fureman
*Assistant Examiner* — Esayas G Yeshaw
(74) *Attorney, Agent, or Firm* — Ray Quinney & Nebeker P.C.; Paul N. Taylor (57) ABSTRACT

A device for providing power to a server rack includes a first AC input port, a second AC input port, a first relay, a second relay, and an output port. The output port is electrically connected to both the first AC input port and second AC input port. The first relay is electrically between the first AC input port and the output port, and the second relay is electrically between the second AC input port and the output port. The first relay and second relay are configured to compare a first phase of a first voltage from the first AC input port to a second phase of a second voltage from the second AC input.

20 Claims, 4 Drawing Sheets

(56) References Cited

U.S. PATENT DOCUMENTS

2022/0137136 A1* 5/2022 Johansen ............... H03K 3/017
 324/415
2022/0140751 A1* 5/2022 Qi ........................ H02M 1/007
 363/126

OTHER PUBLICATIONS

Lin, Paul, "Rack Powering Options for High Density in 230 V AC Countries", In the White Paper 28, Version 2 of Schneider Electric-Data Center Science Center, Aug. 19, 2021, 19 Pages.

S, et al., "Multi inputs and Single Output DC-DC Converter for Renewable Energy Resources", In International Journal of Engineering Research & Technology (IJERT), vol. 5, Issue 13, 2017, 6 Pages.

Zhao, et al., "An Advanced Power and Thermal Optimized High Density Rack Solution for Data Center Energy Efficiency", In Proceedings of 19th IEEE Intersociety Conference on Thermal and Thermomechanical Phenomena in Electronic Systems (ITherm), Jul. 21, 2020, 6 Pages.

* cited by examiner

SYSTEMS AND METHODS FOR COMBINING POWER SOURCES IN DATACENTERS

BACKGROUND

Background and Relevant Art

Server racks provide power to the server computers connected thereto. Conventionally, the server racks include a power distribution device or bus bar to distribute power from a power source to the server computers and other electronic devices. Newer generations of server computing and other electronic devices can have higher power demands than the devices the server rack infrastructure was originally intended to support.

BRIEF SUMMARY

In some embodiments, a device for providing power to a server rack includes a first AC input port, a second AC input port, a first relay, a second relay, and an output port. The output port is electrically connected to both the first AC input port and second AC input port. The first relay is electrically between the first AC input port and the output port, and the second relay is electrically between the second AC input port and the output port. The first relay and second relay are configured to compare a first phase of a first voltage from the first AC input port to a second phase of a second voltage from the second AC input.

In some embodiments, a device for providing power to a server rack includes a first AC input port, a second AC input port, an output port, and a means for signal conditioning. The output port is electrically connected to both the first AC input port and second AC input port. The signal conditioning converts the second AC input voltage received at the second AC input port to the same voltage and phase as the first AC input voltage received at the first AC input port.

In some embodiments, a method of providing power to a server rack includes receiving a first AC input voltage at a first AC input port, receiving a second AC input voltage at a second AC input port, converting the first AC input voltage to a first direct current (DC) voltage, converting the second AC input voltage to a second DC voltage, combining the first DC voltage and the second DC voltage to create a combined DC voltage, and outputting an output voltage based on the combined DC voltage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to systems and methods for providing electrical power to electronic devices. More particularly, the present disclosure relates to providing electrical power in a datacenter and/or server rack.

Server racks generally include a bus bar to provide electrical power to server blades and other electronic devices connected to the server rack. In some instances, the server rack has a fixed amount of power available for distribution to the devices on the server rack. Computing devices, such as those installed on server blades, are ever increasing in computational power and associated power draw to perform those computations. For example, modern datacenters include computing devices for performing computation-heavy processes such as machine learning, artificial intelligence, large dataset processing, and graphical processing operations. High-capacity processors, memory, storage devices, and networking are used to perform such computation-heavy processes in less time. The increased power requirements to support high-capacity processors, in some embodiments, exceed the power capacity of a server rack. Conventionally, two power sources may provide input to a server rack by way of a switch would be used to change the electrical connection between the two power sources to provide an uninterruptible power supply (UPS), such that when the first power source fails, the UPS switches to the second power source to provide a continuous flow of electricity to the server rack.

In some embodiments, power convergence devices according to the present disclosure allow the combination of electrical power from a plurality of sources into a single output for use in a server rack. In such embodiments, two or more power sources can be combined to provide a single output to the server rack of greater electrical power. In some embodiments, two power sources are combined to increase the available current to the server rack, such as through the existing bus bar. In some embodiments, two identical power sources are combined to provide double the current of each power source individually. In at least one embodiment, a server rack and/or datacenter have two identical power inputs that can provide redundancy and a UPS for a server rack, and the two power sources are combined, according to the present disclosure, to provide a higher-power power source to the server rack to support high-capacity processors and computing devices.

Figure 1:
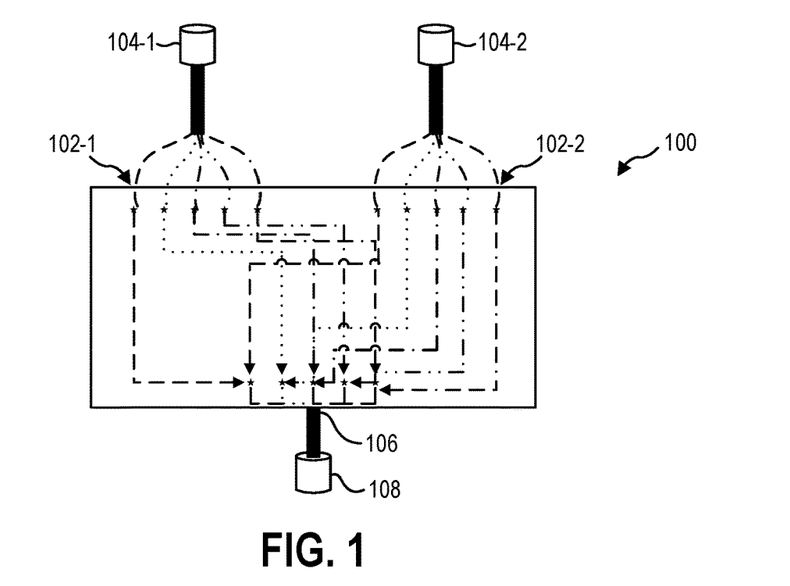
FIG. 1 is a schematic representation of a convergence device, according to at least one embodiment of the present disclosure.

Referring now to FIG. 1, in some embodiments, a convergence device 100 includes alternating current (AC) input ports 102-1, 102-2 that are configured to connect to power sources 104-1, 104-2. In some embodiments, the power sources 104-1, 104-2 provide the same input power to the convergence device 100. In some examples, a server rack receives power from two power sources that each provide a 415 Volt (V) and 30 Ampere (A) electrical current. In some embodiments, the first power source 104-1 and second power source 104-2 are connected to one another in the convergence device 100 to provide a combined output at the same voltage and double the current of the inputs, which is 415 V and 60 A in the provided example. The convergence device 100 provides an output port 106 to which the server rack, bus bar, or other electronic device(s) 108 can connect to receive the high-current output voltage.

Figure 2:
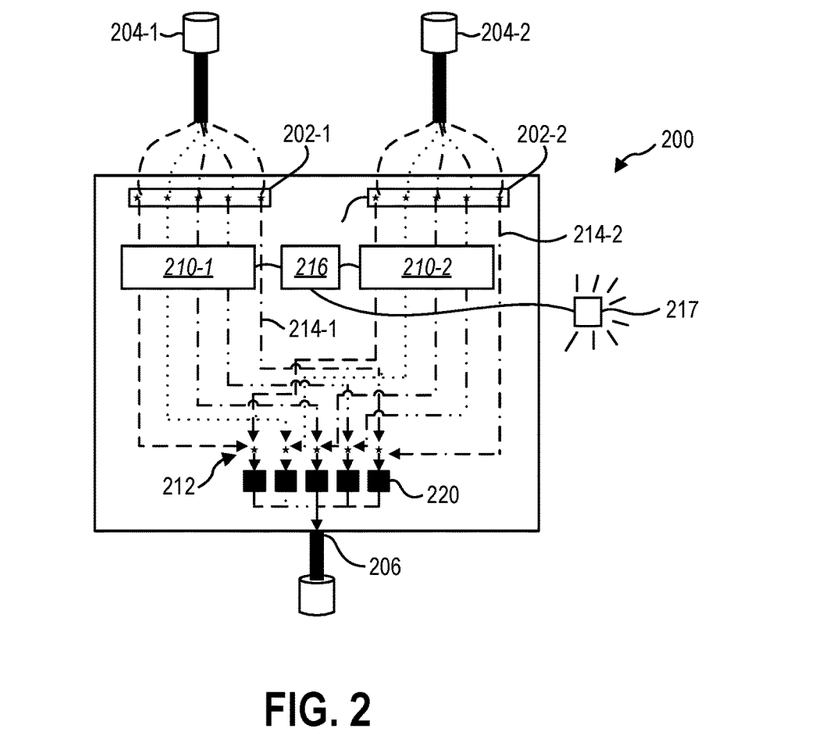
FIG. 2 is a schematic representation of a convergence device including relays, according to at least one embodiment of the present disclosure.

In some embodiments, combining two power sources can damage associated circuitry. For example, when the first input voltage is out-of-phase with the second input voltage, the output voltage produced by connecting the wiring will be inconsistent in voltage and/or current, which may damage electronic device(s) exposed to the output voltage. FIG. 2 illustrates an embodiment of a convergence device 200 that includes at least one relay. A relay is an electrically operated switch that opens and closes circuit(s) by receiving electrical signal(s) from outside source(s). In some embodiments, the convergence device 200 includes a first relay 210-1 electrically in line with a first AC input port 202-1 and a second relay 210-2 electrically in line with a second AC input port 202-2. For example, the relays 210-1, 210-2 are positioned electrically between the AC input ports 202-1, 202-2 and the junction 212 at which the input currents combine prior to the output port 206. Relays provide protection to the circuit beyond conventional fuses or circuit breakers. In conventional server racks, datacenters, and other IT applications, circuits and electronic devices can be protected by circuit protection devices, such as fuses and/or circuit breakers, when a short or other over-current event occurs. In some instances, the conventional circuit protection devices can require a technician to physically go to the location of the circuit protection device and repair, replace, or reset the circuit protection device. This can be result in delays in restoring operations, as technicians may not be immediately available to repair, replace, or reset the circuit protection device. Additionally, some server racks or server computers are not easily accessible due to thermal management or security concerns. A relay can reversibly prevent a short or other over-current event that would otherwise activate the circuit protection device.

In some embodiments, at least one of the relays 210-1, 210-2 includes a normally-open contact. A normally-open contact is open until the relay is energized. In some embodiments, the relays 210-1, 210-2 are powered by the power sources 204-1, 204-2 connected to the respective AC input ports 202-1, 202-2. For example, the first relay 210-1 can only be energized if a first power source 204-1 is connected to the first AC input port 202-1.

The relay shorts (e.g., closes), in some embodiments, when the first AC input voltage received at the first AC input port 202-1 and the second AC input voltage received at the second AC input port 202-2 are in-phase. For example, the convergence device 200 combines the first AC input voltage and the second AC input voltage when the first AC input voltage and the second AC input voltage have the same voltage at the same time. In some embodiments, a controller 216 is in communication with at least one of the relays 210-1, 210-2. The controller 216 compares the first AC input voltage to the second AC input voltage and determines whether the AC input voltages are in-phase. When the AC input voltages are in-phase, the controller 216 energizes the relay(s) 210-1, 210-2, and the two AC input voltages are combined at the junction 212, providing a combined output voltage at the output port 206.

In some embodiments, at least one of the relays 210-1, 210-2 includes a normally-closed contact. A normally-closed contact is closed until the relay is energized. In some embodiments, the relays 210-1, 210-2 are powered by the power sources 204-1, 204-2 connected to the respective AC input ports 202-1, 202-2. For example, the first relay 210-1 can only be energized if a first power source 204-1 is connected to the first AC input port 202-1.

The relay will open, in some embodiments, when the first AC input voltage received at the first AC input port 202-1 and the second AC input voltage received at the second AC input port 202-2 are out-of-phase. For example, the convergence device 200 combines the first AC input voltage and the second AC input voltage when the first AC input voltage and the second AC input voltage have the same voltage at the same time. In some embodiments, the relays 210-1, 210-2 control the energized wires from the AC input ports 202-1, 202-2, while the ground wires 214-1, 214-2 of each bypasses the relays 210-1, 210-2 to the junction 212.

In some embodiments, a controller 216 is in communication with at least one of the relays 210-1, 210-2. The controller compares the first AC input voltage to the second AC input voltage and determines whether the AC input voltages are out-of-phase. When the AC input voltages are out-of-phase, the controller 216 energizes the relay(s) 210-1, 210-2 to open one or both of the circuits to the junction 212 to prevent a combined output voltage at the output port 206.

In some embodiments, the convergence device 200 includes only one relay (e.g., the second relay 210-2). In such embodiments, the first AC input port 202-1 is connected to the junction 212 directly, while a relay 210-2 is positioned electrically between the second AC input port 202-2 and the junction 212. In some embodiments, the relay 210-2 can selectively allow the second AC input voltage through to the junction 212 when the first AC input voltage and the second AC input voltage are in-phase.

While protective of the system, when one relay is open, the output port 206 only provides an output voltage based on one of the AC input voltages. For example, a system with two AC input voltages of 415 V and 30 A each would provide an output voltage of only 30 A.

The controller 216 and/or relays 210-1, 210-2 consume a relatively small amount of electrical power compared to the AC input voltages provided to the convergence device 200. In some embodiments, the controller 216 is powered by the first AC input voltage received at the first AC input port 202-1 and/or second AC input voltage received at the second AC input port 202-2. A controller 216 that is powered by the first AC input voltage and/or the second AC input voltage allows the convergence device 200 to operate without the need for a separate power source for the convergence device 200.

In some embodiments, the convergence device 200 further includes a signal device 217. The signal device 217 provides a visual and/or audible communication to a technician related to the state of the relays 210-1, 210-2. In some embodiments, a signal device 217 is in data communication with the controller 216. In some embodiments, the signal device 217 is in data communication with the first relay 210-1 and/or the second relay 210-2. In some embodiments, the signal device 217 has a first state that indicates the output voltage is a combined signal from the first AC input voltage and the second AC input voltage. In some embodiments, the signal device 217 has a second state that indicates the output voltage includes one of the first AC input voltage and the second AC input voltage. In some embodiments, the signal device 217 includes individual states to indicate which of the first AC input voltage and the second AC input voltage are included in the output voltage. For example, the signal device 217 may be silent when the output voltage is a combined signal from the first AC input voltage and the second AC input voltage, and provide an audible alarm when the output voltage includes only one of the first AC input voltage and the second AC input voltage. In some examples, the signal device 217 includes one or more lights that visually indicate which of the first AC input voltage and the second AC input voltage are passed to the outlet port 206. In some embodiments, the signal device 217 illuminates when both the first AC input voltage and the second AC input voltage are combined before the output port 206 and remains dark otherwise (e.g., when only one of the first AC input voltage and the second AC input voltage is passed to the output port 206).

In some embodiments, a convergence device according to the present disclosure includes a signal conditioner. The signal conditioner manipulates the AC input voltage prior to combination at a junction and/or manipulates the combined signal prior to output. Any suitable signal conditioner that changes one or more properties of an electrical signal may be used and the particular signal conditioner used will depend on the needs of the particular convergence device. For example, the signal conditioner may include rectifier(s), inverter(s), transformer(s), or other electronic devices or circuitry that change one or more properties of an electrical signal.

Figure 3:
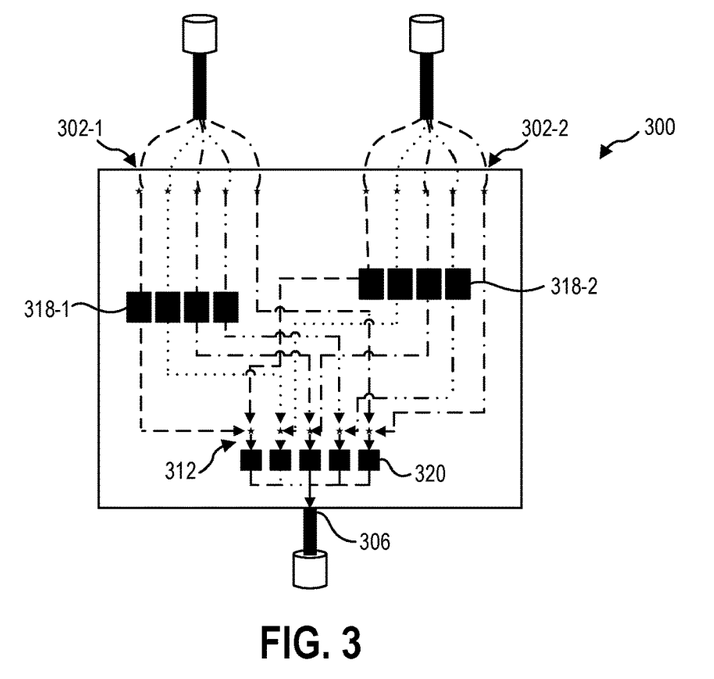
FIG. 3 is a schematic representation of a convergence device for combining out-of-phase input voltages, according to at least one embodiment of the present disclosure.

FIG. 3 is a schematic illustration of another embodiment of a convergence device 300. In some embodiments, the convergence device 300 includes a plurality of rectifiers 318-1, 318-2. A rectifier converts AC voltage to direct current (DC) signal. The first rectifiers 318-1 convert the first AC input voltage received at the first AC input port 302-1 to a first DC voltage and the second rectifiers 318-2 convert the second AC input voltage received at the second AC input port 302-2 to a second DC voltage. The first DC voltage and second DC voltage can be combined even when the AC voltages are out-of-phase.

In some embodiments, one or more of the rectifiers 318-1, 318-2 includes power factor correction (PFC). PFC improves the power factor of the voltage(s). In some embodiments, a power factor controller is integrated into one or more of the rectifiers 318-1, 318-2 and filters out harmonics and/or shifts at least a portion of the waveform to follow the voltage. In some embodiments, a power factor controller is electrically in line with one or more of the rectifiers 318-1, 318-2. In some embodiments, the power sources that supply the first AC input voltage and/or second AC input voltage include PFC. In such embodiments, the convergence device 300 does not include PFC, as the first AC input voltage and second AC input voltage are already corrected.

The first DC voltage and the second DC voltage are combined at the junctions 312 into a combined DC voltage. In some embodiments, the combined DC voltage is then provided to inverters 320. Inverters change DC voltages to AC voltages and allow the combined DC voltage to be output at the output port 306 as an output AC voltage. In some embodiments, the inverters 320 are sine wave inverters. Sine wave inverters approximate a sine wave in the output waveform. In some embodiments, the inverters 320 are square wave inverters. Square wave inverters produce a square waveform in the output AC voltage. In some embodiments, the electronic device(s) powered by the combined output is powered by DC voltages. In such embodiments, the combined output is rectified prior to being provided to the electronic device(s).

Figure 4:
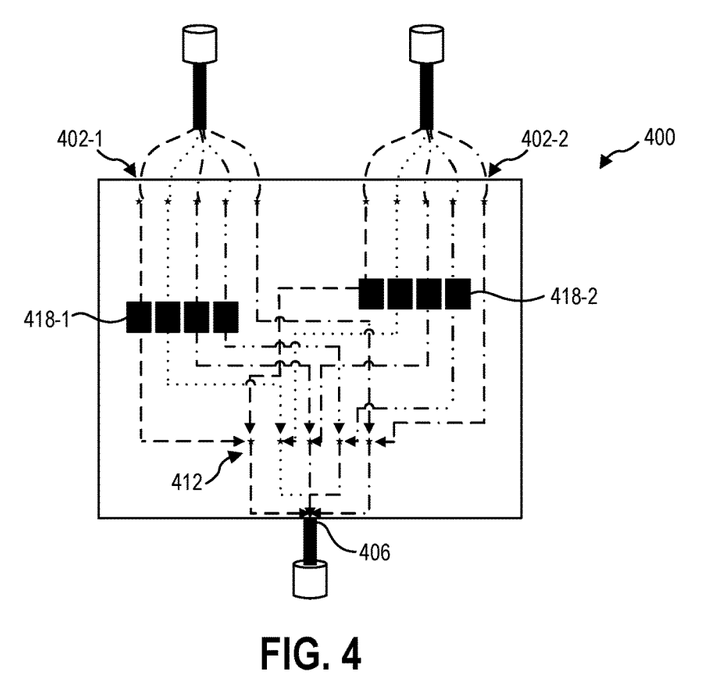
FIG. 4 is a schematic representation of another convergence device for combining out-of-phase input voltages, according to at least one embodiment of the present disclosure.

FIG. 4 is an embodiment of a convergence device 400 that rectifies the input AC voltages to produce a DC voltage for each of the input AC voltages received at the first AC input port 402-1 and second AC input port 402-2 respectively. In some embodiments, the rectifiers 418-1, 418-2 convert the input AC voltages to DC voltages of substantially equivalent voltage and/or current. After converting the input AC voltages to DC voltages, the original phase of the AC voltages is removed from the signals, allowing the DC voltages to be combined at the junction 412 without concern of the signals being out-of-phase. In some embodiments, the output port 406 then provides a DC output voltage with the combined power of both the first AC input voltage and the second AC input voltage.

Figure 5:
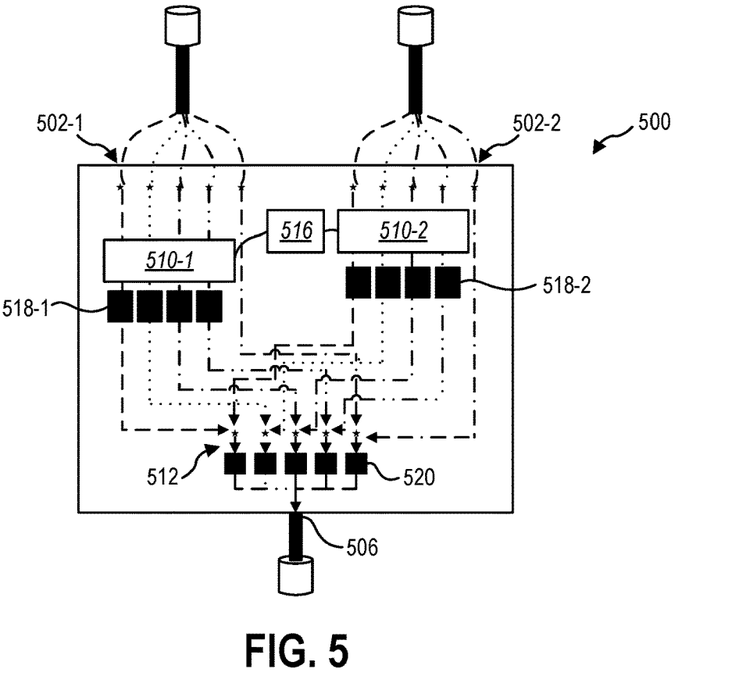
FIG. 5 is a schematic representation of a convergence device with selective control of combining out-of-phase input voltages, according to at least one embodiment of the present disclosure.

In some embodiments, a convergence device includes both relays for circuit protection and rectifiers to facilitate combining out-of-phase signals. For example, FIG. 5 illustrates an embodiment of a convergence device 500 with relays 510-1, 510-2 electrically between each of the AC input ports 502-1, 502-2 and the respective set of rectifiers 518-1, 518-2. In some embodiments, the relays 510-1, 510-2 are in communication with and/or controlled by a controller 516 that compares a phase of the input AC voltages received at the AC input ports 502-1, 502-2.

In some embodiments, the first AC input voltage and the second AC input voltage are combined only if particular circumstances are present. For example, an embodiment of a convergence device 500 such as shown in FIG. 5 allows for the controller 516 to selectively combine the input AC voltages or select one of the AC voltages at a time to provide an UPS. In some embodiments, the controller 516 is in communication with at least one of the relays 510-1, 510-2. The controller compares the first AC input voltage to the second AC input voltage and determines whether the AC input voltages are in-phase. When the AC input voltages are out-of-phase, the controller 516 energizes the relay(s) 510-1, 510-2 to open one or both of the circuits to the junction 512 to prevent a combined output voltage at the output port 506.

The controller 516 and/or relays 510-1, 510-2 consume a relatively small amount of electrical power compared to the AC input voltages provided to the convergence device 500. In some embodiments, the controller 516 is powered by the first AC input voltage received at the first AC input port 502-1 and/or second AC input voltage received at the second AC input port 502-2. A controller 516 that is powered by the first AC input voltage and/or the second AC input voltage allows the convergence device 500 operate without the need for a separate power source for the convergence device 500.

In some embodiments, the controller 516 is in data communication with a control plane or rack manager. The control plane or rack manager may call for an increased power delivery from the server rack by combining the AC input voltages, even when the first AC input voltage and the second AC input voltage are out-of-phase. In such embodiments, the rectifiers 518-1, 518-2 convert the first AC input voltage and second AC input voltage into a first DC voltage and second DC voltage, respectively. The DC voltages are combined at the junction 512. In some embodiments, the combined DC voltage is inverted at the inverters 520 to provide an output AC voltage at the output port 506. In some embodiments, the combined DC voltage is output at the output port 506 to connected electronic devices and/or a server rack bus bar.

Figure 6:
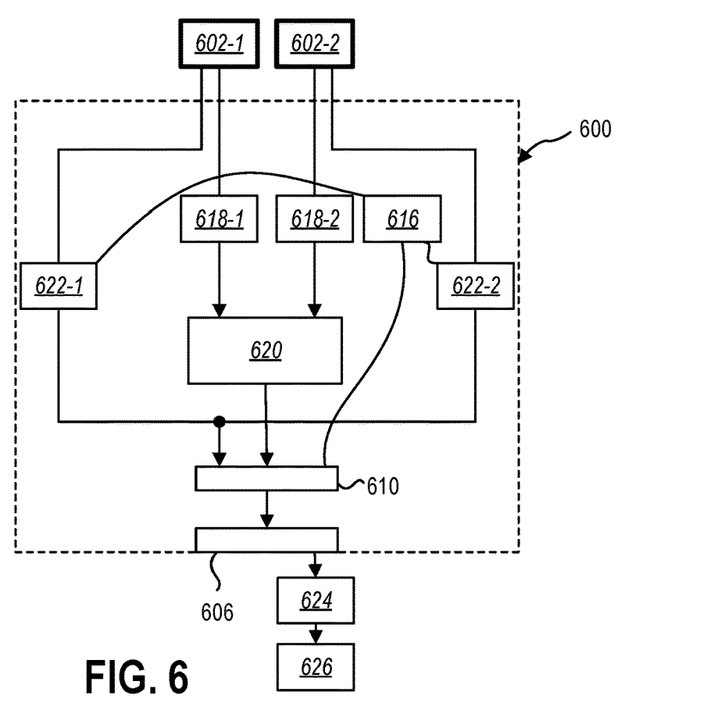
FIG. 6 is a schematic representation of a convergence device with an electrical bypass, according to at least one embodiment of the present disclosure.

As discussed above, rectifiers and inverters can condition an input voltage to allow the input voltages to be combined when out-of-phase. The rectifiers and inverters, however, can dissipate energy and reduce efficiency. FIG. 6 is a schematic representation of another embodiment of a convergence device 600. In some embodiments, a convergence device 600 includes one or more bypass switches 622-1, 622-2 that allow the first AC input voltage and the second AC input voltage from the first AC input port 602-1 and second AC input port 602-2, respectively, to be connected directly when a controller 616 determines the first AC input voltage and the second AC input voltage to be in-phase. In some embodiments, the controller 616 further communicates with a relay 610 to selectively electrically connect the circuit with the bypass switches 622-1, 622-2 to the output port 606 to direct the combined AC voltage to the output port 606.

In some embodiments, if the controller 616 determines the first AC input voltage and the second AC input voltage to be out-of-phase, the controller 616 opens the bypass switch(es), and the first AC input voltage and the second AC input voltage are directed through the rectifiers 618-1, 618-2, respectively, to the inverter 620, where the signals are combined. In some embodiments, the controller 616 further communicates with the relay 610 to selectively electrically connect the circuit with the inverter 620 to the output port 606 to direct the combined AC voltage to the output port 606. The output port 606, in some embodiments, is connected to a power shelf 624 and/or a bus bar 626 of the server rack to distribute power to the electronic devices connected thereto. In some embodiments, existing server racks with dual power sources for UPS can be operated at higher power levels to accommodate a broader range of electronic devices with higher power consumption than originally intended.

Figure 7:
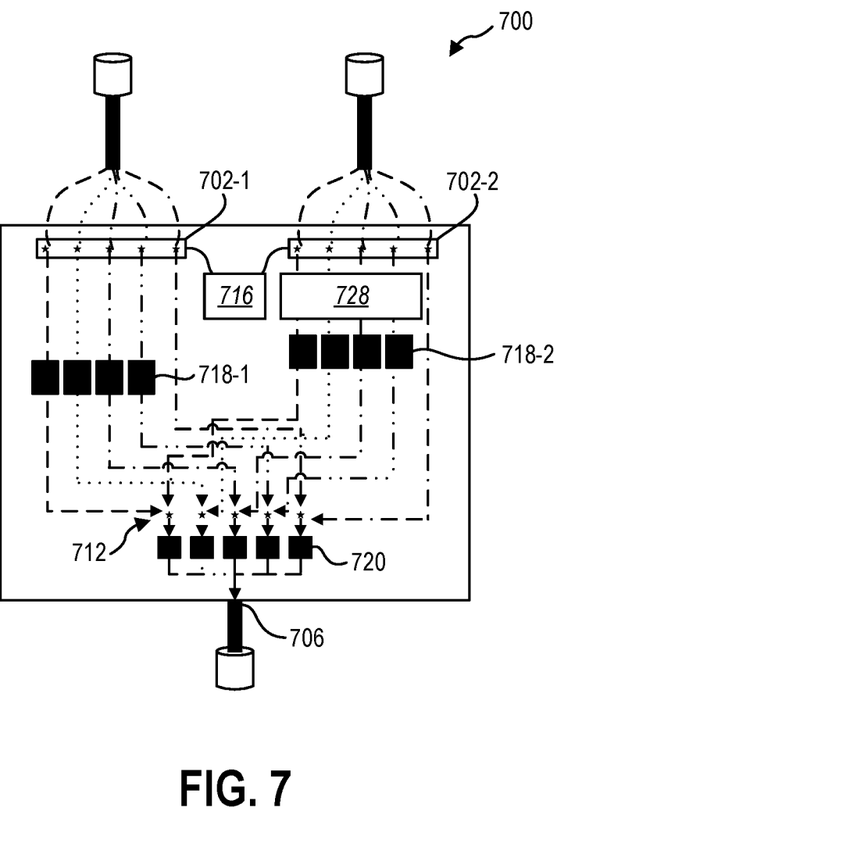
FIG. 7 is a schematic representation of a convergence device with a transformer, according to at least one embodiment of the present disclosure.

FIG. 7 is a schematic diagram of another convergence device 700 that can condition AC input voltages with different voltages and/or amperages. In some embodiments, the convergence device 700 includes a controller 716 that compares the first AC input voltage and the second AC input voltage. In some embodiments, the convergence device 700 includes a transformer 728 to alter the voltage and/or current of the second AC input voltage to be combinable with the first AC input voltage. For example, the first AC input voltage and the second AC input voltage have different voltages. The transformer 728 conditions the second AC input voltage to match the voltage of the first AC input voltage such that the first AC input voltage and the second AC input voltage are combinable at the same voltage as the first AC input voltage. In some embodiments, the transformer 728 changes the phase of the second AC input voltage, and the convergence device 700 includes rectifiers 718-1, 718-2 and an inverter 720 to further condition the first AC input voltage and the transformed second AC voltage. In some embodiments, the combined AC voltage is output at the output port 706. In some embodiments, the convergence device 700 combines the first DC voltage and the second DC voltage after the rectifiers 718-1, 718-2 without inverting the DC voltages, and the combined DC voltage is output at the output port 706.

In some embodiments, a rack manager or power shelf is in data communication with the controller 716 to receive information regarding the AC input voltages. For example, when different power sources are connected to the convergence device 700 and an electrical load is applied thereto, the power draw on the power sources is equal. In some embodiments, the total power limit of the combined power sources is limited by the limit of the smaller power source.

INDUSTRIAL APPLICABILITY

The present disclosure relates generally to systems and methods for providing electrical power to electronic devices. More particularly, the present disclosure relates to providing electrical power in a datacenter and/or server rack.

Server racks generally include a bus bar to provide electrical power to server blades and other electronic devices connected to the server rack. In some instances, the server rack has a fixed amount of power available for distribution to the devices on the server rack. Computing devices, such as those installed on server blades, are ever increasing in computational power and associated power draw to perform those computations. For example, modern datacenters include computing devices for performing computation-heavy processes such as machine learning, artificial intelligence, large dataset processing, and graphical processing operations. High-capacity processors, memory, storage devices, and networking are used to perform such computation-heavy processes in less time. The increased power requirements to support high-capacity processors, in some embodiments, exceed the power capacity of a server rack. Conventionally, two power sources may provide input to a server rack by way of a switch would be used to change the electrical connection between the two power sources to provide an uninterruptible power supply (UPS), such that when the first power source fails, the UPS switches to the second power source to provide a continuous flow of electricity to the server rack.

In some embodiments, power convergence devices according to the present disclosure allow the combination of electrical power from a plurality of sources into a single output for use in a server rack. In such embodiments, two or more power sources can be combined to provide a single output to the server rack of greater electrical power. In some embodiments, two power sources are combined to increase the available current to the server rack, such as through the existing bus bar. In some embodiments, two identical power sources are combined to provide double the current of each power source individually. In at least one embodiment, a server rack and/or datacenter have two identical power inputs that can provide redundancy and a UPS for a server rack, and the two power sources are combined, according to the present disclosure, to provide a higher-power power source to the server rack to support high-capacity processors and computing devices.

In some embodiments, a convergence device includes alternating current (AC) input ports that are configured to connect to power sources. In some embodiments, the power sources provide the same input power to the convergence device. In some examples, a server rack receives power from two power sources that each provide a 415 Volt (V) and 30 Ampere (A) electrical current. In some embodiments, the first power source and second power source are connected to one another in the convergence device to provide a combined output at the same voltage and double the current of the inputs, which is 415 V and 60 A in the provided example. The convergence device provides an output port to which the server rack, bus bar, or other electronic device(s) can connect to receive the high-current output voltage.

In some embodiments, combining two power sources can damage associated circuitry. For example, when the first input voltage is out-of-phase with the second input voltage, the output voltage produced by connecting the wiring will be inconsistent in voltage and/or current, which may damage electronic device(s) exposed to the output voltage. In some embodiments, a convergence device includes at least one relay. A relay is an electrically operated switch that opens and closes circuit(s) by receiving electrical signal(s) from outside source(s).

In some embodiments, the convergence device includes a first relay electrically in line with a first AC input port and a second relay electrically in line with a second AC input port. For example, the relays are positioned electrically between the AC input ports and the junction at which the input currents combine prior to the output port. Relays provide protection to the circuit beyond conventional fuses or circuit breakers. In conventional server racks, datacenters, and other IT applications, circuits and electronic devices can be protected by circuit protection devices, such as fuses and/or circuit breakers, when a short or other over-current event occurs. In some instances, the conventional circuit protection devices can require a technician to physically go to the location of the circuit protection device and repair, replace, or reset the circuit protection device. This can be result in delays in restoring operations, as technicians may not be immediately available to repair, replace, or reset the circuit protection device. Additionally, some server racks or server computers are not easily accessible due to thermal management or security concerns. A relay can reversibly prevent a short or other over-current event that would otherwise activate the circuit protection device.

In some embodiments, at least one of the relays includes a normally-open contact. A normally-open contact is open until the relay is energized. In some embodiments, the relays are powered by the power sources connected to the respective AC input ports. For example, the first relay can only be energized if a first power source is connected to the first AC input port.

The relay shorts (e.g., closes), in some embodiments, when the first AC input voltage received at the first AC input port and the second AC input voltage received at the second AC input port are in-phase. For example, the convergence device combines the first AC input voltage and the second AC input voltage when the first AC input voltage and the second AC input voltage have the same voltage at the same time. In some embodiments, a controller is in communication with at least one of the relays. The controller compares the first AC input voltage to the second AC input voltage and determines whether the AC input voltages are in-phase. When the AC input voltages are in-phase, the controller energizes the relay(s) and the two AC input voltages are combined at the junction, providing a combined output voltage at the output port.

In some embodiments, at least one of the relays includes a normally-closed contact. A normally-closed contact is closed until the relay is energized. In some embodiments, the relays are powered by the power sources connected to the respective AC input ports. For example, the first relay can only be energized if a first power source is connected to the first AC input port.

The relay will open, in some embodiments, when the first AC input voltage received at the first AC input port and the second AC input voltage received at the second AC input port are out-of-phase. For example, the convergence device combines the first AC input voltage and the second AC input voltage when the first AC input voltage and the second AC input voltage have the same voltage at the same time. In some embodiments, the relays control the energized wires from the AC input ports, while the ground wires of each bypasses the relays to the junction.

In some embodiments, a controller is in communication with at least one of the relays. The controller compares the first AC input voltage to the second AC input voltage and determines whether the AC input voltages are out-of-phase. When the AC input voltages are out-of-phase, the controller energizes the relay(s) to open one or both of the circuits to the junction to prevent a combined output voltage at the output port.

In some embodiments, the convergence device includes only one relay (e.g., the second relay). In such embodiments, the first AC input port is connected to the junction directly, while a relay is positioned electrically between the second AC input port and the junction. In some embodiments, the relay can selectively allow the second AC input voltage through to the junction when the first AC input voltage and the second AC input voltage are in-phase.

While protective of the system, when one relay is open, the output port only provides an output voltage based on one of the AC input voltages. For example, a system with two AC input voltages of 415 V and 30 A each would provide an output voltage of only 30 A.

The controller and/or relays consume a relatively small amount of electrical power compared to the AC input voltages provided to the convergence device. In some embodiments, the controller is powered by the first AC input voltage received at the first AC input port and/or second AC input voltage received at the second AC input port. A controller that is powered by the first AC input voltage and/or the second AC input voltage allows the convergence device to operate without the need for a separate power source for the convergence device.

In some embodiments, the convergence device further includes a signal device. The signal device provides a visual and/or audible communication to a technician related to the state of the relays. In some embodiments, a signal device is in data communication with the controller. In some embodiments, the signal device is in data communication with the first relay and/or the second relay. In some embodiments, the signal device has a first state that indicates the output voltage is a combined signal from the first AC input voltage and the second AC input voltage. In some embodiments, the signal device has a second state that indicates the output voltage includes one of the first AC input voltage and the second AC input voltage. In some embodiments, the signal device includes individual states to indicate which of the first AC input voltage and the second AC input voltage are included in the output voltage. For example, the signal device may be silent when the output voltage is a combined signal from the first AC input voltage and the second AC input voltage and provide an audible alarm when the output voltage includes only one of the first AC input voltage and the second AC input voltage. In some examples, the signal device includes one or more lights that visually indicate which of the first AC input voltage and the second AC input voltage are passed to the outlet port. In some embodiments, the signal device illuminates when both the first AC input voltage and the second AC input voltage are combined before the output port and remains dark otherwise (e.g., when only one of the first AC input voltage and the second AC input voltage is passed to the output port).

In some embodiments, a convergence device according to the present disclosure includes a signal conditioner. The signal conditioner manipulates the AC input voltage prior to combination at a junction and/or manipulates the combined signal prior to output. Any suitable signal conditioner that changes one or more properties of an electrical signal may be used and the particular signal conditioner used will depend on the needs of the particular convergence device. For example, the signal conditioner may include rectifier(s), inverter(s), transformer(s), or other electronic devices or circuitry that change one or more properties of an electrical signal.

In some embodiments, the convergence device includes a plurality of rectifiers. A rectifier converts AC voltage to direct current (DC) signal. The first rectifiers convert the first AC input voltage received at the first AC input port to a first DC voltage and the second rectifiers convert the second AC input voltage received at the second AC input port to a second DC voltage. The first DC voltage and second DC voltage can be combined even when the AC voltages are out-of-phase.

In some embodiments, one or more of the rectifiers includes power factor correction (PFC). PFC improves the power factor of the voltage(s). In some embodiments, a power factor controller is integrated into one or more of the rectifiers and filters out harmonics and/or shifts at least a portion of the waveform to follow the voltage. In some embodiments, a power factor controller is electrically in line with one or more of the rectifiers. In some embodiments, the power sources that supply the first AC input voltage and/or second AC input voltage include PFC. In such embodiments, the convergence device does not include PFC, as the first AC input voltage and second AC input voltage are already corrected.

The first DC voltage and the second DC voltage are combined at the junctions into a combined DC voltage. In some embodiments, the combined DC voltage is then provided to inverters. Inverters change DC voltages to AC voltages and allow the combined DC voltage to be output at the output port as an output AC voltage. In some embodiments, the inverters are sine wave inverters. Sine wave inverters approximate a sine wave in the output waveform. In some embodiments, the inverters are square wave inverters. Square wave inverters produce a square waveform in the output AC voltage. In some embodiments, the electronic device(s) powered by the combined output is powered by DC voltages. In such embodiments, the combined output is rectified prior to being provided to the electronic device(s).

In some embodiments, a convergence device rectifies the input AC voltages to produce a DC voltage for each of the input AC voltages received at the first AC input port and second AC input port respectively. In some embodiments, the rectifiers convert the input AC voltages to DC voltages of substantially equivalent voltage and/or current. After converting the input AC voltages to DC voltages, the original phase of the AC voltages is removed from the signals, allowing the DC voltages to be combined at the junction without concern of the signals being out-of-phase. In some embodiments, the output port then provides a DC output voltage with the combined power of both the first AC input voltage and the second AC input voltage.

In some embodiments, a convergence device includes both relays for circuit protection and rectifiers to facilitate combining out-of-phase signals. An embodiment of a convergence device has relays electrically between each of the AC input ports and the respective set of rectifiers. In some embodiments, the relays are in communication with and/or controlled by a controller that compares a phase of the input AC voltages received at the AC input ports.

In some embodiments, the first AC input voltage and the second AC input voltage are combined only if particular circumstances are present. For example, an embodiment of a convergence device allows for the controller to selectively combine the input AC voltages or select one of the AC voltages at a time to provide an UPS. In some embodiments, the controller is in communication with at least one of the relays. The controller compares the first AC input voltage to the second AC input voltage and determines whether the AC input voltages are in-phase. When the AC input voltages are out-of-phase, the controller energizes the relay(s) to open one or both of the circuits to the junction to prevent a combined output voltage at the output port.

The controller and/or relays consume a relatively small amount of electrical power compared to the AC input voltages provided to the convergence device. In some embodiments, the controller is powered by the first AC input voltage received at the first AC input port and/or second AC input voltage received at the second AC input port. A controller that is powered by the first AC input voltage and/or the second AC input voltage allows the convergence device to operate without the need for a separate power source for the convergence device.

In some embodiments, the controller is in data communication with a control plane or rack manager. The control plane or rack manager may call for an increased power delivery from the server rack by combining the AC input voltages, even when the first AC input voltage and the second AC input voltage are out-of-phase. In such embodiments, the rectifiers convert the first AC input voltage and second AC input voltage into a first DC voltage and second DC voltage, respectively. The DC voltages are combined at the junction. In some embodiments, the combined DC voltage is inverted at the inverters to provide an output AC voltage at the output port. In some embodiments, the combined DC voltage is output at the output port to connected electronic devices and/or a server rack bus bar.

As discussed above, rectifiers and inverters can condition an input voltage to allow the input voltages to be combined when out-of-phase. The rectifiers and inverters, however, can dissipate energy and reduce efficiency. In some embodiments, a convergence device includes one or more bypass switches that allow the first AC input voltage and the second AC input voltage from the first AC input port and second AC input port, respectively, to be connected directly when a controller determines the first AC input voltage and the second AC input voltage to be in-phase. In some embodiments, the controller further communicates with a relay to selectively electrically connect the circuit with the bypass switches to the output port to direct the combined AC voltage to the output port.

In some embodiments, if the controller determines the first AC input voltage and the second AC input voltage to be out-of-phase, the controller opens the bypass switch(es), and the first AC input voltage and the second AC input voltage are directed through the rectifiers, respectively, to the inverter, where the signals are combined. In some embodiments, the controller further communicates with the relay to selectively electrically connect the circuit with the inverter to the output port to direct the combined AC voltage to the output port. The output port, in some embodiments, is connected to a power shelf and/or a bus bar of the server rack to distribute power to the electronic devices connected thereto. In some embodiments, existing server racks with dual power sources for UPS can be operated at higher power levels to accommodate a broader range of electronic devices with higher power consumption than originally intended.

In some embodiments, a convergence device conditions AC input voltages with different voltages and/or amperages. In some embodiments, the convergence device includes a controller that compares the first AC input voltage and the second AC input voltage. In some embodiments, the convergence device includes a transformer to alter the voltage and/or current of the second AC input voltage to be combinable with the first AC input voltage. For example, the first AC input voltage and the second AC input voltage have different voltages. The transformer conditions the second AC input voltage to match the voltage of the first AC input voltage such that the first AC input voltage and the second AC input voltage are combinable at the same voltage as the first AC input voltage. In some embodiments, the transformer changes the phase of the second AC input voltage, and the convergence device includes rectifiers and an inverter to further condition the first AC input voltage and the transformed second AC voltage. In some embodiments, the combined AC voltage is output at the output port. In some embodiments, the convergence device combines the first DC voltage and the second DC voltage after the rectifiers without inverting the DC voltages, and the combined DC voltage is output at the output port.

In some embodiments, a rack manager or power shelf is in data communication with the controller to receive information regarding the AC input voltages. For example, when different power sources are connected to the convergence device and an electrical load is applied thereto, the power draw on the power sources is equal. In some embodiments, the total power limit of the combined power sources is limited by the limit of the smaller power source.

The present disclosure relates to systems and methods for powering electronic components of a computer or computing device according to at least the examples provided in the sections below:

[A1] In some embodiments, a device for providing power to a server rack includes a first AC input port, a second AC input port, a first relay, a second relay, and an output port. The output port is electrically connected to both the first AC input port and second AC input port. The first relay is electrically between the first AC input port and the output port, and the second relay is electrically between the second AC input port and the output port. The first relay and second relay are configured to compare a first phase of a first voltage from the first AC input port to a second phase of a second voltage from the second AC input.

[A2] In some embodiments, the first relay and second relay of [A1] are further configured to open at least one of the first relay and second relay when the first phase and second phase are out-of-phase.

[A3] In some embodiments, at least one of the first relay and the second relay of [A1] or [A2] includes a normally open contact.

[A4] In some embodiments, the device of any of [A1] through [A3] further includes a controller in electrical communication with the first relay and the second relay, and the controller compares the first phase to the second phase.

[A5] In some embodiments, the device of any of [A1] through [A4] further includes a first AC input voltage and a second AC input voltage, and the first AC input voltage and the second AC input voltage have the same voltage.

[A6] In some embodiments, the device of any of [A1] through [A5] further includes a first AC input voltage and a second AC input voltage, and the first AC input voltage and the second AC input voltage have the same current.

[A7] In some embodiments, the device of any of [A1] through [A6] further includes a signal device in a first state when the first relay and second relay are closed and in a second state when at least one of the first relay and the second relay is open.

[A8] In some embodiments, the device of any of [A1] through [A6] further includes a rectifier electrically between the first AC input port and the output port.

[A9] In some embodiments, the device of [A8] further includes an inverter electrically between the rectifier and the output port.

[B1] In some embodiments, a device for providing power to a server rack includes a first AC input port, a second AC input port, an output port, and a means for signal conditioning. The output port is electrically connected to both the first AC input port and second AC input port. The signal conditioning converts the second AC input voltage received at the second AC input port to the same voltage and phase as the first AC input voltage received at the first AC input port.

[B2] In some embodiments, the means for signal conditioning of [B1] includes a rectifier.

[B3] In some embodiments, the means for signal conditioning of [B1] includes an inverter.

[B4] In some embodiments, the means for signal conditioning of [B1] includes a transformer.

[B5] In some embodiments, the device of any of [B1] through [B4] includes a bypass switch to electrically connect the first AC input port to the second AC input port without the means for signal conditioning therebetween.

[B6] In some embodiments, the device of any of [B1] through [B5] includes a controller in communication with the first AC input port and the second AC input port and configured to compare a first phase of a first AC input voltage received at the first AC input port to a second phase of a second AC input voltage received at the second AC input port.

[B7] In some embodiments, the controller of [B6] is configured to close the bypass switch when the first phase and second phase are in-phase.

[B8] In some embodiments, the device of any of [B1] through [B7] includes a relay configured to selectively electrically connect the means for signal conditioning to the output port and electrically connect the bypass switch to the output port.

[C1] In some embodiments, a method of providing power to a server rack includes receiving a first AC input voltage at a first AC input port, receiving a second AC input voltage at a second AC input port, converting the first AC input voltage to a first direct current (DC) voltage, converting the second AC input voltage to a second DC voltage, combining the first DC voltage and the second DC voltage to create a combined DC voltage, and outputting an output voltage based on the combined DC voltage.

[C2] In some embodiments, the method of [C1] further includes inverting the combined DC voltage to a combined AC voltage.

[C3] In some embodiments, the method of [C1] further includes comparing a first phase of the first AC input voltage to a second phase of the second AC input voltage and bypassing at least one rectifier before combining the first AC input voltage and second AC input voltage without converting the first AC input voltage and the second AC input voltage.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device comprising:
    a first alternating current (AC) input port;
    a second AC input port;
    an output port electrically connected to both the first AC input port and second AC input port;
    a first relay electrically between the first AC input port and the output port;
    a second relay electrically between the second AC input port and the output port;
    a first rectifier configured to convert a first AC input voltage from the first AC input port to a first direct current (DC) voltage;
    a second rectifier configured to convert a second AC input voltage from the second AC input port to a second DC voltage;
    a junction configured to combine the first DC voltage and second DC voltage into a combined DC voltage; and
    an inverter configured to convert the combined DC voltage to an AC output voltage.

2. The device of claim 1, wherein the first relay and second relay are further configured to open at least one of the first relay and second relay when a first phase of the first AC input voltage from the first AC input port and a second phase of the second AC input voltage from the second AC input port are out-of-phase.

3. The device of claim 1, wherein at least one of the first relay and the second relay includes a normally open contact.

4. The device of claim 1, further comprising a controller in electrical communication with the first relay and the second relay, wherein the controller compares a first phase of the first AC input voltage from the first AC input port to a second phase of the second AC input voltage from the second AC input port.

5. The device of claim 1, further comprising a first AC input voltage and a second AC input voltage, wherein the first AC input voltage and the second AC input voltage have the same voltage.

6. The device of claim 1, further comprising a first AC input voltage and a second AC input voltage, wherein the first AC input voltage and the second AC input voltage have the same current.

7. The device of claim 1, further comprising a signal device in a first state when the first relay and second relay are closed and in a second state when at least one of the first relay and the second relay is open.

8. The device of claim 1, further comprising a transformer.

9. The device of claim 1, wherein at least one of the first rectifier and second rectifier includes power factor correction.

10. A device comprising:
    a first alternating current (AC) input port;
    a second AC input port;
    an output port electrically connected to the first AC input port and the second AC input port;
    a first rectifier configured to convert a first AC input voltage from the first AC input port to a first direct current (DC) voltage;
    a second rectifier configured to convert a second AC input voltage from the second AC input port to a second DC voltage;
    a junction configured to combine the first DC voltage and second DC voltage into a combined DC voltage; and
    an inverter configured to convert the combined DC voltage to an AC output voltage and provide the AC output voltage to the output port.

11. The device of claim 10, wherein at least one of the first rectifier and second rectifier includes power factor correction.

12. The device of claim 10, further comprising a transformer.

13. The device of claim 10, further comprising a bypass switch that is configured to allow the first AC input voltage to bypass the first rectifier.

14. The device of claim 13, further comprising a controller configured to compare a first phase of the first AC input voltage to a second phase of the second AC input voltage.

15. The device of claim 14, wherein the controller is configured to close the bypass switch when the first phase and second phase are in-phase.

16. The device of claim 13, further comprising a first relay configured to selectively electrically connect the bypass switch to the output port.

17. A method comprising:
   at a server rack:
      receiving a first alternating current (AC) input voltage at a first AC input port;
      receiving a second AC input voltage at a second AC input port;
      converting the first AC input voltage to a first direct current (DC) voltage;
      converting the second AC input voltage to a second DC voltage;
      producing a combined DC voltage by combining the first DC voltage and the second DC voltage;
      inverting the combined DC voltage to a combined AC voltage; and
      outputting an output voltage based on the combined AC voltage.

18. The method of claim 17, further comprising:
   determining that a first phase of the first AC input voltage and a second phase of the second AC input voltage are out-of-phase.

19. The method of claim 17, further comprising transforming at least one of the first AC input voltage and the second AC input voltage with a transformer.

20. The method of claim 17, further comprising correcting a power factor of at least one of the first DC voltage and the second DC voltage.

* * * * *